E. E. MAHER.
SELF LOCKING NUT.
APPLICATION FILED OCT. 10, 1912.

1,201,323.   Patented Oct. 17, 1916.

Witnesses:
Earl E. Howe
Robert S. McCreadie

Inventor:
Eugene E. Maher
by
Atty.

UNITED STATES PATENT OFFICE.

EUGENE E. MAHER, OF CHICAGO, ILLINOIS, ASSIGNOR TO K. NUT CO., OF CHICAGO, ILLINOIS, A CORPORATION OF ILLINOIS.

SELF-LOCKING NUT.

1,201,323.　　　　Specification of Letters Patent.　　Patented Oct. 17, 1916.

Application filed October 10, 1912. Serial No. 724,924.

*To all whom it may concern:*

Be it known that I, EUGENE E. MAHER, a citizen of the United States, and a resident of Chicago, Cook county, Illinois, have invented certain new and useful Improvements in Self-Locking Nuts, of which the following is a specification.

The general object of my invention is to provide a simple one-piece nut which can be manufactured at low cost, which shall be of substantially the same dimensions as standard commercial nuts and which shall be capable of being locked in position upon a bolt by screwing it tightly against a load surface.

Another object of my invention is to provide a self locking nut which can be applied by unskilled mechanics with an ordinary wrench and which can be repeatedly used upon a bolt without destroying either the nut or the bolt.

Further objects of my invention will appear hereinafter.

My invention consists generally in a one-piece lock nut of unique form, construction, and arrangement whereby the objects named above, and others are attainable.

Figure 1:
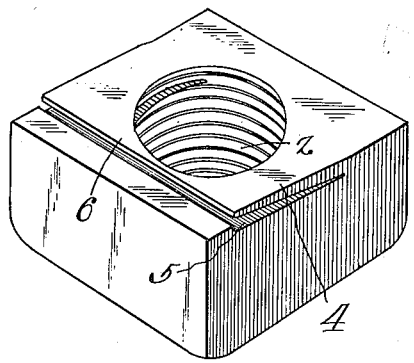
Figure 2:
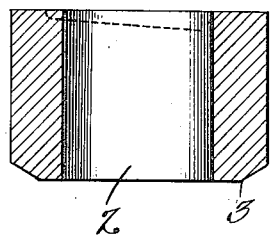
Figure 3:
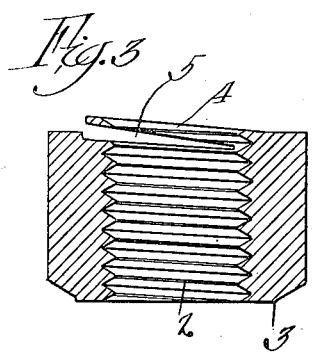
Figure 4:
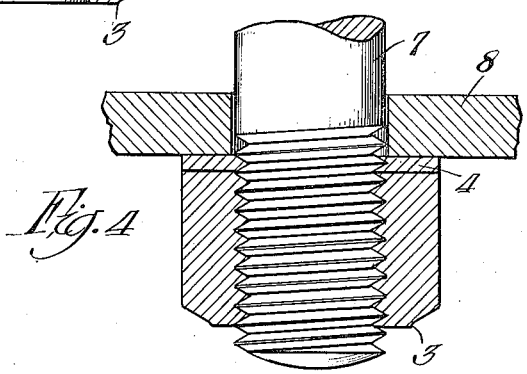

My invention will be more readily understood by reference to the accompanying drawings which illustrate the preferred forms of my invention and in which;

Figure 1 is a perspective view of a nut embodying my invention; Fig. 2 is a cross sectional view through my nut in process of manufacture; Fig. 3 is a cross sectional view similar to Fig. 2 but showing the completely formed nut; Fig. 4 is a sectional view showing the nut locked in place upon a bolt and against a load surface.

Referring now to the drawings, I shall describe in detail my nut which embodies the necessary and desirable features of a practical lock nut.

My nut may be made by any of the well known nut making processes, such as severing from a bar of metal a piece of metal of nut size and either simultaneously or subsequently forming a bolt hole 2 therein. In this operation a crown 3 is formed on one end of the nut and this I prefer to retain as the non-load end of the nut. In the opposite end of the nut I form a locking portion. This is formed from the body of the nut by cutting into the nut at an angle to the vertical axis of the bolt hole. In this manner I form or set up the locking portion 4. I preferably use a tool of such shape that a substantially wedge-shaped recess 5 is formed between the locking portion 4 and the body of the nut, and I preferably cut into the nut in manner to form the locking portion into a single wing 6 which is connected to the body of the nut along the line adjacent to the outer part of the bolt hole. I have indicated in Fig. 2 by dotted lines the preferred position of the cut. After the formation of the wing 6 I thread the bolt hole. In this manner the body of the nut is provided with a plurality of threads and the locking portion 4 which is preferably quite thin, is provided with a less number of threads. The threads on the locking portion are thereby mounted as on a lever and since the wing 6 is set up with removal of but little metal it can be restored to preformed position without danger of breakage. Restoring the wing 6 moves the threads thereof out of alinement with the threads of the body portion. This is the action of the nut when it is screwed upon a bolt 7 as indicated in Fig. 4. The bolt as tapped is usually made of such size that it can be readily started on the bolt and screwed to the position in which the wing contacts the load surface 8. Further advancement of the nut requires considerable effort since it is accomplished only by the depression of the wing 6. This depression of the wing moves the threads carried thereby into forceful frictional engagement with the contiguous bolt threads. When the nut reaches the position indicated in Fig. 4, that is, when the wing has been entirely reset, it acts to prevent any undesired rotation of the nut upon the bolt. The nut, however, may be forcibly removed by means of a wrench and while the locking wing may slightly distort the bolt threads it does not distort them to such a degree that the nut and bolt cannot again be used.

In certain classes of work the excessive vibration and other actions cause the load surface to recede. If the metal of my nut is of such texture that it has a considerable spring, the wing 6 will move out with the load surface and thereby release its locking hold. Hence for this class of work I prefer to make the nut metal of such composition that once the locking wing has been depressed it will retain this position irrespective of continued engagement with the load surface. Therefore the nut will be held in locked position upon the bolt even though the load surface should recede.

The form of my invention, as shown and described admirably accomplish the objects outlined in the opening of the specification, but since the relative size of the locking portion and the body portion, and the precise form of the nut can be somewhat modified without sacrificing the substantial advantages of the nut disclosed, I do not wish to limit myself strictly to them except as required by the scope of the appended claims.

Having thus described my invention, I claim as new and desire to secure by Letters Patent:

1. A one-piece lock nut provided with a bolt hole and comprising a body portion and a relatively small locking portion, said locking portion consisting of a single lever-like wing spaced from the body of the nut by a substantially wedge-shaped recess of substantially knife edge width at the juncture of the wing and body portion, said lever-like wing being separated from the nut body along a line parallel to the nut side and adjacent the periphery of the bolt hole, regularly formed screw threads in the body of the nut and in the locking portion, said locking portion being depressible to preformed position for the purpose of locking the nut upon the bolt.

2. A self locking nut of substantially the proportions of standard commercial nuts comprising a body portion and a relatively thin locking portion integral therewith, said locking portion consisting of a single wing-like member set up from the body of the nut and flaring gradually from its line of juncture with the nut body adjacent the periphery of the bolt hole, said locking portion being substantially tangential to the body portion at its juncture therewith and being formed substantially without removal of metal, screw threads in both the locking portion and the body portion made after the locking portion is set up, as and for the purpose specified.

In testimony whereof, I have hereunto set my hand this 5th day of October 1912 in the presence of two subscribing witnesses.

EUGENE E. MAHER.

Witnesses:
ARTHUR W. NELSON,
JOHN R. LEFEVRE.